April 6, 1965     B. SALTZBERG     3,177,489

INTERFERENCE SUPPRESSION SYSTEMS

Filed Jan. 11, 1960     5 Sheets-Sheet 1

BERNARD SALTZBERG
INVENTOR.

BY

ATTORNEY

3,177,489
INTERFERENCE SUPPRESSION SYSTEMS
Bernard Saltzberg, Los Angeles, Calif., assignor to Thompson Ramo Wooldridge Inc., Canoga Park, Calif., a corporation of Ohio
Filed Jan. 11, 1960, Ser. No. 1,695
4 Claims. (Cl. 343—100)

This invention relates to improvements in interference suppression systems and more particularly to a novel interference cancellation system particularly useful in providing side lobe suppression in directional receiving systems.

Interference in electrical communication systems may be generally termed as any signal which renders more difficult or produces confusion in the detection of a desired signal. Interference may be produced by natural sources such as by atmospheric phenomena or may be man-made such as that generated by electrical transmitters outside the system. In either case, unless corrective measures are taken, such interference, if allowed to enter the communication system, will generally produce a response other than that intended or desired. Therefore, it is generally the practice to either isolate the communication system from the interference or provide means for cancelling the interference once it has entered the system. Complete isolation of a complex communication system is in most cases impractical and in many cases physically impossible due to the multitude of possible ways interference can enter and deleteriously act upon the system. Therefore, there exists a continuing need for effective interference cancellation systems which will substantially eliminate the effects of interference once it has entered a communication system.

Interference cancellation is often required even in communication systems wherein signal reception is directional in nature, such as direction finding systems employing radar. In such directional receiving systems, detection of direction is accomplished by receiving signals with a directional antenna. As is commonly known, the effective sensitivity or gain of such a directional antenna varies in accordance with some predetermined function of the direction from which or to which energy is received or transmitted from the antenna itself. The directional characteristics when graphically depicted in a polar coordinate system appear as a radiation or reception pattern having marked zones in which the sensitivity or gain of the antenna is more or less concentrated. These concentrated zones are known as "lobes," directional antennae usually possessing a single rather narrow "main" lobe of high gain or sensitivity and several spaced apart "minor" or "side" lobes of relatively lower gain or sensitivity. By knowing the positions of these lobes about a given antenna array, the direction of a given signal of interest may be determined by changing the orientation of the antenna until the intensity of the detected signal is maximized. The direction from which the received signal is emanated is then taken to be along a line coincident with the symmetrical axis of the main lobe of the array. Interference in such systems, however, may produce several different undesired effects upon this directional detection depending upon the location of the interference source and the intensity of the interference signal emanating from the source. For example, if the interference lies within the frequency spectrum of the receiving system and is being generated or is radiating from the same direction as the signal of interest, the receiver may be unable to determine which signal it is receiving. In a radar system, this results in a "strobe" upon the radar display scope thereby tending to mask or hide any reflective objects within the main lobe. This may also prevent desired range determinations from being made. If the interference is being received from a direction other than the main lobe and is of sufficient magnitude to penetrate the side lobe of an antenna, a false directional indication might result at the receiver. This is due to the fact that, regardless of whether a signal of interest is present, signal energy reaches the receiver just as though a signal of interest were penetrating the main lobe of the antenna. In a radar system, this side lobe penetration would also appear as a strobe on the display scope in the direction of the lobe. The area of this strobe or interference smear is in general a positive function of the magnitude of the interference signal. Therefore, if the interference signal were of a sufficient magnitude, a strobe might be developed which would encompass a major portion of the display scope thereby masking or hiding a number of signal sources of reflective objects in the area.

From the above, it is readily seen that interference in communication systems and particularly in directional receiving systems, such as radar, may cause serious adverse effects. The elimination of such effects is, therefore, clearly desirable.

To counteract the problems associated with interference in communication systems and particularly those of directional receiving systems, such as radar, certain systems have been developed which provide a degree of side lobe suppression. The effectiveness of such systems is usually restricted to a rather limited number of different operating environmental conditions. For example, one such system providing side lobe suppression is disclosed in the United States patent to F. R. Collbohn, 2,825,900, which issued March 4, 1958. As disclosed therein, there is provided a primary receiving system or receiving antenna arrangement having a radiation pattern preferably directional and an auxiliary receiving system or receiving antenna arrangement, the radiation pattern of which, in relative value of power distribution, envelops, that is, has gain or power values greater than those of the primary, in the unwanted directions of reception, and has gain or power values less than those of the primary in the wanted direction. The two receiving systems or antenna arrangements are provided with circuitry means for cutting out any incoming signal unless the signal from the primary receiving system is greater than the signal from the auxiliary receiving system, so that signals are received only when in the direction in which the power values of the primary receiver are greater than those of the auxiliary receiver. In other words, a signal is received by both receiving systems or antenna arrangements and the output of the auxiliary receiver is used to control the threshold bias level of the primary receiver so that no signal is transmitted or passed to the indicator or other such device unless the signal from the primary receiver is stronger than that from the auxiliary receiver.

Suppression systems, such as described above, operating at video frequencies after demodulation, provide satisfactory interference cancellation and side lobe suppression when a single source of interference is present, or when only a single side lobe of a directional receiver is being penetrated. However, when the signal or echo received by the main lobe of the directional antenna is at a lower power level than the interference signals received by the auxiliary antenna, the effect of the low power level signal may be suppressed since more actual signal power is delivered to the "strength" comparison circuit by the auxiliary antenna than by the directional antenna.

In view of the above and in accordance with the present invention, the effects of interference associated with a communication system and received by a first or primary receiving means thereof is substantially eliminated by use of a second or auxiliary receiving means which is controlled to develop a signal having substantially the same amplitude and timing characteristics as that of the interference. By subtracting on an alternating current basis the signal developed by the second means from that received by the first means, an alternating current remainder or difference signal substantially free from interference is produced.

To provide the signal necessary for such interference cancellation, the second receiving means, in accordance with the present invention, includes means for receiving or deriving substantially the same interference as received by the first receiving means. By way of example only, in an electromagnetic wave processing system, such deriving means may include an antenna constructed and positioned to preferentially receive the interference signal generated by a particular interference source.

In order to control the signal thus derived so that it will substantially correspond to the interference signal received by the first receiving means, timing and amplitude control elements are provided. To control these elements, means are provided for comparing both the timing and amplitude of the interference signal received by the first receiving means with the timing and amplitude of the interference signal received by the second receiving means. The output of the amplitude and timing comparison means is then utilized to control the amplitude and timing control elements such that the derived signal of the second receiving means obtains and maintains correspondence in both time and amplitude with the interference signal received by the first receiving means. Therefore, upon subtraction of the signal received by the second receiving means from the signal received by the first receiving means, the remainder signal produced is substantially free of interference.

In a preferred embodiment of the present invention, the signal comparison means are signal correlators. Basically, a signal correlator is any arrangement which produces an output signal, the magnitude of which is substantially proportional to the time-averaged product of the signals applied thereto, where the effective period over which the product is averaged is not substantially less than one-half of the reciprocal of the bandwidth occupied by that one of said applied signals which occupies the narrowest bandwidth.

More particularly, in embodiments of this invention which utilize correlators, two types of correlators are employed. The first, which operates to produce as its output a control signal for controlling the amplitude control element, may be designated as an amplitude correlator. Such a correlator usually comprises means for producing a product signal in response to the signals applied thereto. This product signal is then time-averaged, as above, to produce an output signal. If coherent components are present in the signals being correlated and these components are in substantial time coincidence, the magnitude of the output signal or amplitude control signal is substantially proportional to the amplitude of each of such signal components, and thus the magnitude of this amplitude control signal is substantially proportional to the time-averaged product of the two signal components. By correlating the signal received by the second receiving means with the remainder signal, an amplitude control signal will be developed as long as the remainder signal includes interference components, the magnitude of which may be detected.

The second type of correlator is that which operates to produce a control signal for the timing control element. This type of correlator may be designated as a timing correlator. Such a correlator usually comprises a phase shifting means for shifting the phase of all frequency components in one of the signals applied to the correlator by 90°, a multiplying means for producing a product signal and a time-averaging means responsive to the product signal for developing an output signal. As in the amplitude correlator, the output signal is the time-averaged product of the signals applied to the multiplying means. However, due to the 90° phase shift, this output signal is substantially proportional in magnitude and sign to the magnitude and sign of the timing difference between the coherent components of the signals being compared. Therefore, by correlating the signal received by the second receiving means with the interference signal received by the first receiving means, that is with either the signal received by the first receiving means or the remainder signal, a timing control signal will be developed as long as a timing difference exists between the interference signal of the first receiver means and the signal received by the second receiving means.

In accordance with this invention, signal correlation also provides the means necessary to allow cancellation of a plurality of interference signals which may, for example, originate from a plurality of different sources. By providing a plurality of second or auxiliary receiving means, such as previously described, signals indicative of each interference source are separately derived or received. Thus, signal correlation of the interference signal received by the first receiving means with each of the derived interference signals will provide the system with independent control of the timing and amplitude of each derived interference signal. This is again due to the characteristics of signal correlation as described above, for each correlator will produce a control signal only if the signals being correlated contain coherent components of the particular interference signal. Therefore, regardless of the number of interference signals present, a separate and distinct control signal will be produced to control each derived interference signal whereby, upon subtraction, the single remainder signal will be substantially free from interference.

More particularly, as an example of the above and in accordance with this invention, one embodiment thereof comprises an interference cancellation system providing substantially complete side lobe suppression for a directional receiving system. This particular embodiment utilizes signals received at radio frequencies by an auxiliary directional antenna array associated with a directional receiving system to substantially eliminate the undesired effects of interference such as signals received by side lobes of a directional antenna of the receiving system. By operating at radio frequencies prior to demodulation within the receiver associated with the directional receiving system, this embodiment overcomes the problems associated with the interaction of a plurality of noise signals within the receiver, thereby allowing cancellation of the noise signals generated by any number of sources. Also, due to the directivity of the auxiliary antenna array, undesirable cancellation of low power level echo signals is avoided.

A more complete understanding of the above, as well as other features and objects of this invention, may be obtained by reference to the following detailed description, when considered in connection with the drawings, in which.

Figure 1:
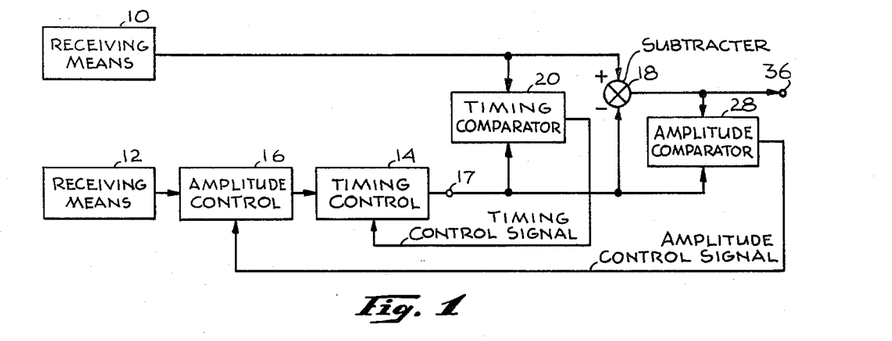
FIGURE 1 is a block diagram of a signal cancellation system embodying the features of this invention.
Figure 2:
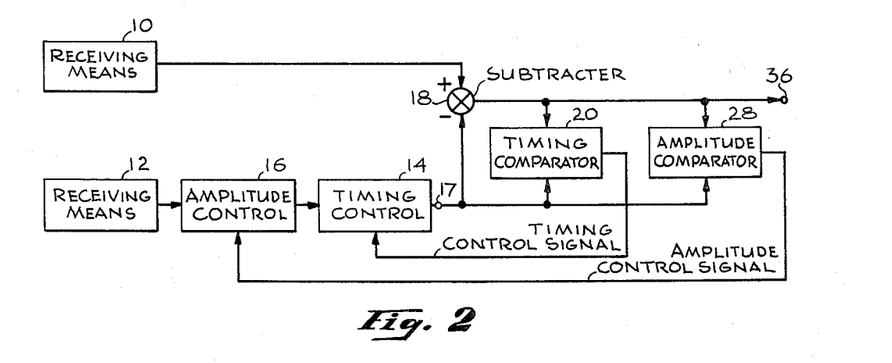
FIG. 2 is a modified block diagram of the signal cancellation system shown in FIG. 1.

In general, FIGS. 1 and 2 illustrate a signal cancellation system for eliminating interference received by a first or primary receiving means represented at 10, in accordance with the features of this invention. As previously described, if a signal having substantially the same amplitude and timing characteristics as the interference to be eliminated can be produced or derived and controlled as to timing and amplitude, a simple alternating current subtraction of such a signal from a desired signal accompanied by the interference will produce an interference-free difference or remainder signal. Briefly, as shown in FIGS. 1 and 2, such a derived signal is produced at a second or auxiliary receiving means represented at 12 and controlled as to timing and amplitude by control elements 14 and 16, respectively, such that as it appears at terminal 17 it substantially corresponds in timing and in amplitude to interference being received by the first receiving means 10.

In accordance with the present invention, the control necessary to properly adjust control elements 14 and 16 is obtained by the use of comparison circuits represented as timing and amplitude comparators 20 and 28, respectively. To provide the desired interference-free remainder signal, the derived signal is then subtracted from the signal received by the first receiving means 10 at a subtractor 18. The remainder signal thus produced is then applied to an output terminal 36 where it may be utilized.

More specifically, let it be assumed that the first or primary receiving means 10, which may be associated with a larger system (not shown), receives a first signal having a first signal component corresponding to desired information and an undesired second signal component attributable to interference. As mentioned above the second or auxiliary receiving means 12 receives a second signal substantially corresponding to only the undesired second signal component of the first signal. Preferred means for producing or receiving the second signal will be discussed in detail in connection with FIGS. 9 and 10. In order to control the amplitude and timing of the second signal so that it will correspond in timing and in amplitude to the interference or second signal component of the first signal, the second signal is applied to timing and amplitude control elements 14 and 16, respectively. Suitable means for controlling the timing and amplitude of electrical signals are well known in the art. The second signal is transmitted through elements 14 and 16, controlled as to timing and amplitude, and applied to linear signal combining network such as a subtractor means 18. The first signal is also applied to subtractor means 18. Subtractor means 18 may be, for example, a nonreciprocal branching network, such as the well known "magic T," having the first signal and the second signal applied to opposite collinear arms thereof and a difference or remainder signal developed at the "E-plane" arm. If the second signal corresponds substantially to the second signal component (of the first signal) in timing and amplitude, the remainder signal thus produced will be substantially free from interference.

In order that control elements 14 and 16 may be accurately adjusted to provide this timing and amplitude correspondence of the second signal and the second signal component, means are provided for comparing the timing and amplitude of the second signal with the timing and amplitude of the second signal component. The output or control signals developed by this signal comparison are then utilized to provide adjustment of the amplitude and timing control elements.

More particularly, the necessary timing and amplitude control signals are developed by a timing comparator 20 and an amplitude comparator 28, respectively. By comparing the remainder signal with the second signal, an amplitude control signal is developed which, upon application to amplitude control element 16, provides the necessary adjustment thereof. In both FIGS. 1 and 2, the timing control signal which, upon application to timing control element 14, will provide accurate adjustment thereof, is developed by comparing the second signal with the second signal component. In FIG. 1, the timing control signal is developed by comparing the second signal component of the first signal with the second signal, and in FIG. 2 by comparing the second signal component present in the remainder signal with the second signal.

Figure 5:
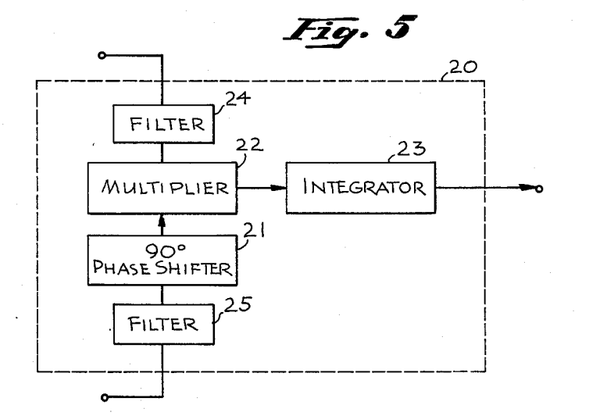
FIG. 5 is a block diagram of a preferred timing comparator circuit.
Figure 6:
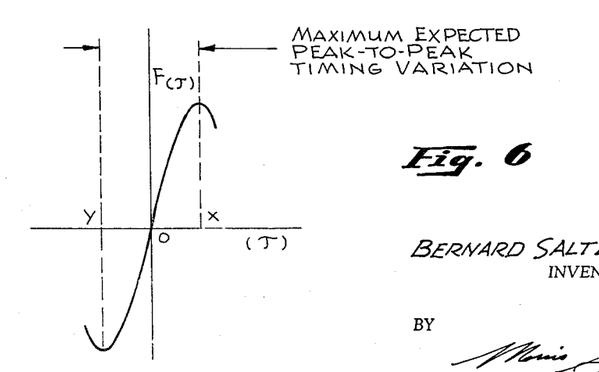
FIG. 6 is a graphical representation of the magnitude of the output signal of the comparator circuit of FIG. 5 as a function of the timing difference between the signals being compared.

More particularly, in accordance with a preferred embodiment of the present invention, the signal comparators of FIGS. 1 and 2 may be signal correlators. Block diagrams of such correlators are represented in FIGS. 3 and 5 and the associated output characteristics of each graphically represented in FIGS. 4 and 6, respectively.

Figure 3:
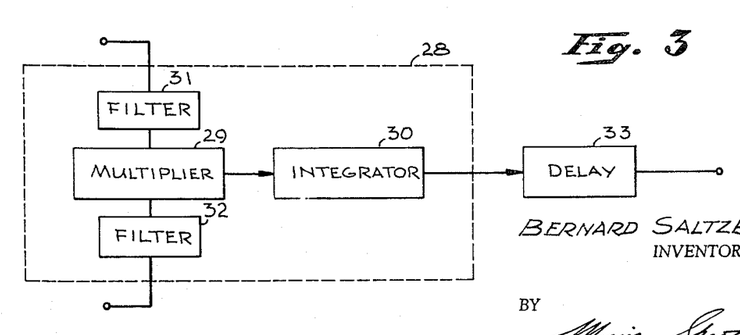
FIG. 3 is a block diagram of a preferred amplitude signal comparator circuit.

FIG. 3 represents, in block form that which has been previously termed herein as an amplitude correlator. As illustrated, basically the amplitude correlator 28 includes means for producing an output or amplitude control signal which is substantially proportional to the time-averaged product of the coherent signal components included in the signals applied thereto. More specifically, when utilizing the amplitude correlator of FIG. 3 as the amplitude comparator means of FIGS. 1 and 2, the remainder signal and second signal are applied to a multiplier circuit 29 which produces a product signal. The product signal thus produced is then applied to an integrator unit 30 where it is time-averaged over a period of time not substantially less than one-half of the reciprocal of the bandwidth of the narrowest band signal being correlated. Then, as previously mentioned, if the signals applied to the correlator do not contain coherent components, the time-averaged product of the signals applied thereto will be substantially zero. If, however, mutually coherent components are included in the signals being compared, then for any given amplitude of coherent components, an output or control signal will be developed, the magnitude of which, if graphically plotted as a function of the timing displacement ($\tau$) between the mutually coherent components applied to the correlator, will appear substantially as shown in FIG. 4.

Figure 4:
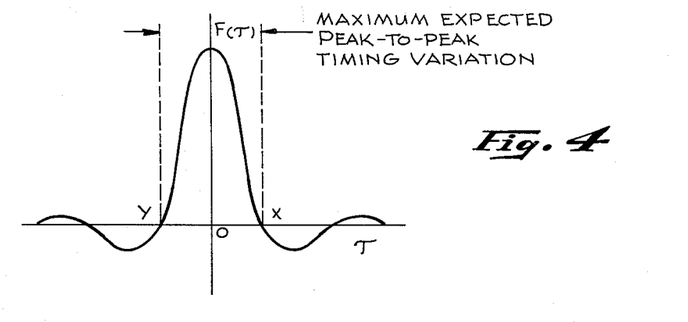
FIG. 4 is a graphical representation of the magnitude of the output of the comparator circuit of FIG. 3 as a function of the timing difference between the signals being compared.

From FIG. 4 it is seen that the output of an amplitude correlator, such as 28, varies as the timing difference between the coherent components of the signals being compared. Therefore, for optimum accuracy and operation, it is necessary that the timing difference between the coherent components of the signals being compared be reduced substantially to a minimum before operation of the amplitude correlator will affect the amplitude of the remainder of the first signal. This may be accomplished by use of what has been previously termed herein as a timing correlator which, in accordance with the present invention, is preferably given a substantially more rapid operation than the amplitude correlator. The delay in the response of amplitude correlator 28 may also be accomplished by interposing a delay element 33 in the output path of amplitude correlator 28, as shown in FIG. 3.

As shown in FIG. 4, the maximum expected peak-to-peak timing variation is depicted as being between the dotted lines $x$ and $y$. It has been found that changes in the frequency bandwidth as a function of the magnitude of the coherent signal components applied to a signal correlator may produce corresponding changes not only in the slope of the correlation output signal as a function of $\tau$ between values of magnitude represented as $F(\tau)=0$, but may also produce changes in the magnitude of $\tau$ for which the correlator output signal will have a magnitude of output represented as $F(\tau)=0$. Thus, conditions may arise where the maximum expected timing variation between the signals being correlated is greater than a range of magnitudes of $\tau$ (about $\tau=0$) for which the magnitude of $F(\tau)$ is greater than zero, thereby introducing possible inaccuracies in the control of the system. Therefore, it may be desired to limit the bandwidth of the signals applied to a correlator prior to multiplication such that the maximum expected timing variation substantially corresponds to a range of values of $\tau$ (about $\tau=0$) for which $F(\tau)$ is greater than or equal to zero. For this purpose, filters represented at 31 and 32 may be interposed, as represented in FIG. 3, at a position prior to the application of signals to multiplier 29.

Thus, in FIGS. 1 and 2, a useful output signal will be developed by amplitude correlator 28 as long as a component of the interference or second signal component is present in the remainder signal, and this component is in substantial timing agreement with interference signals received by receiving means 12. Assuming that the timing difference between the second signal and the second signal component has been reduced to a minimum by the actions of the timing correlator and timing control, the presence of an output at the amplitude correlator means that the amplitude of the second signal is not matching that of the second signal component. Therefore, the amplitude control signal developed at amplitude correlator 28 is applied to the amplitude control element 16 to provide the means for appropriately adjusting the amplitude of the second signal. For example, if a travelling wave tube amplifier is included in amplitude control element 16, the amplitude control signal may be utilized to control the grid bias thereof, which will modify the gain of the travelling wave tube in the proper sense to cause the amplitude of the second signal to match that of the second signal component and produce a substantially complete cancellation of the interference component within the subtractor 18.

As previously mentioned, it may be of importance that the timing difference between the signals being compared be substantially at a minimum before the most effective control of the amplitude control element is obtained. Therefore, in accordance with a preferred embodiment of the present invention, a timing correlator, such as depicted in block form in FIG. 5 is utilized to provide the necessary means for adjusting the timing control element 14 slightly ahead of or prior to the action of the amplitude control element. As illustrated, basically the timing correlator 20 includes means for producing an output or timing control signal which is substantially proportional to the timing difference between the second signal and the second signal component. More specifically, when utilizing the timing correlator of FIG. 5 as the timing comparator means of FIG. 1, the first and second signals are applied thereto. In one of these signals substantially all significant components thereof are shifted in phase by 90° at a phase shifter unit 21 and applied to a multiplier unit 22. The remaining signal is also applied to multiplier 22 to produce a product signal. The product signal is then applied to an integrator unit 23 where it is time-averaged for a period of time not substantially less than one-half the reciprocal of the bandwidth of the narrowest band signal being correlated but for a time which may be chosen to be less than that associated with the amplitude correlator. It will be understood that, as previously mentioned, instead of making the averaging time of the timing comparator less than that of the amplitude comparator, separate delay means may be provided, as shown at 33 in FIG. 3. Therefore, if coherent signal components are being compared, the timing control signal developed will function to correct for differences in timing between the coherent components prior to accurate adjustment of the amplitude control element 16 by the amplitude control signal.

As discussed in connection with FIG. 4, it may be desired to limit the bandwidth of the signals being correlated. In particular, with regard to a timing correlator, it may be desired to limit the bandwidth of the signals applied to the correlator such that the maximum expected timing variation substantially corresponds to a range of values of $\tau$ (about $\tau=0$) for which $F(\tau)$ varies from a maximum to a minimum value of magnitude. For this purpose, filters represented at 24 and 25 may be interposed, as shown in FIG. 5, at a position prior to application of signals to multiplier 22.

As previously mentioned, it is a characteristic of correlators that a substantial output signal will be developed only if coherent signal components are being compared. When utilizing a timing correlator, such as 20, as the timing comparator means, this means that a timing control signal will be developed as long as a timing difference exists between the interference or second signal component and the second signal. From FIG. 6 it is seen that for any given magnitude of first and second signals, the output or timing control signal $F(\tau)$ will vary substantially directly as a function of the magnitude of the timing difference $\tau$ between the coherent signal components being compared. Therefore, as the timing difference is varied by adjusting timing control element 14, a positive or a negative control signal developed at timing correlator 20 will decrease from an absolute maximum magnitude to substantially zero. Thus, by applying the output of timing correlator 20 to element 14, automatic control of the second signal may be obtained such that a substantial correspondence between the timing of the second signal and the interference or second signal component is produced. By way of example, timing control element 14 may include a variable timing shifter, such as a suitably compensated variable ferrite timing control network, providing the necessary variations in timing. When utilizing such a ferrite network, the control signal produced by timing correlator 20 may be utilized to control the current passing through a winding associated with the ferrite which, in turn, controls the timing characteristics presented by the ferrite material. Therefore, in accordance with the present invention, a timing control signal will be developed which will provide means for adjusting a timing control element until the phase difference between the second signal and the interference component of the first signal is substantially zero.

Figure 7:
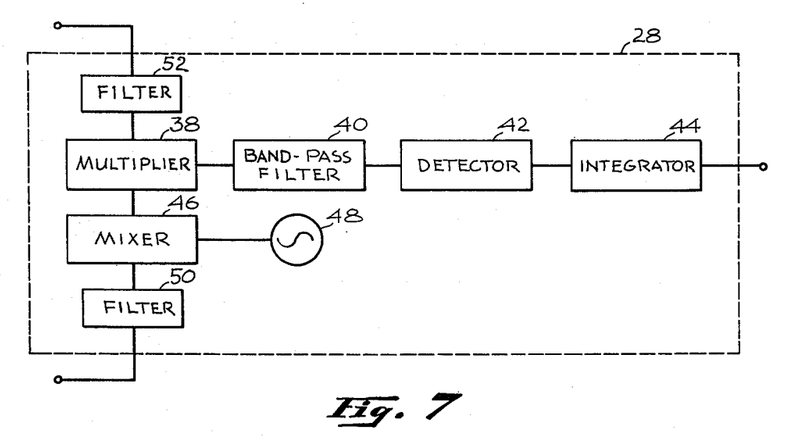
FIG. 7 is a block diagram of an amplitude correlator.
Figure 8:
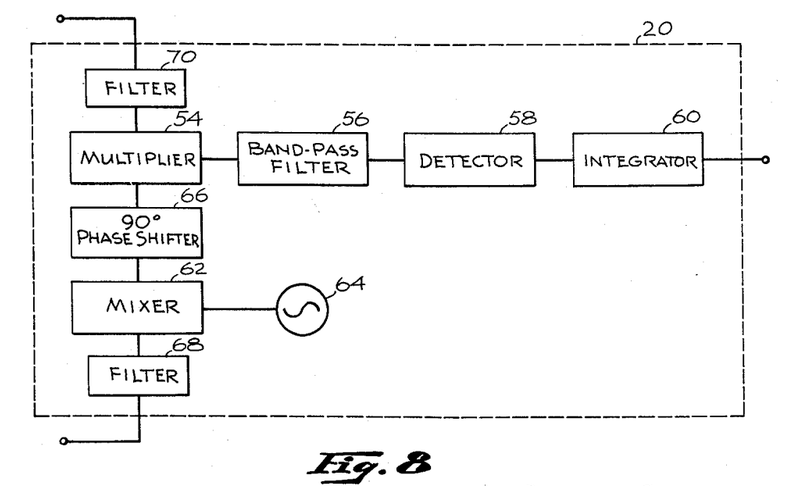
FIG. 8 is a block diagram of a timing correlator.

FIGS. 7 and 8 illustrate preferred embodiments of the basic signal correlators shown in FIGS. 3 and 5. More particularly, FIGS. 7 and 8 represent in block form amplitude and timing signal correlators, respectively, each of the well known alternating current (A.-C.) variety. These correlators exhibit substantially the same output or control signal characteristics as that discussed generally in connection with the correlators represented in FIGS. 3 and 5, respectively. Also the variations in the output of the A.-C. correlators shown in FIGS. 7 and 8 as a function of the timing difference between the coherent signal components being compared substantially correspond to the graphical representations shown in FIGS. 4 and 6, respectively. Thus, the general discussions presented in connection with FIGS. 3 through 6 are applicable to FIGS. 7 and 8 and will not be repeated.

More particularly, as shown in FIG. 7, an amplitude A.-C. correlator, such as may be utilized as amplitude comparator 28 in FIGS. 1 and 2, comprises a multiplier 38, a band-pass filter 40, a detector 42, and an integrator 44 all connected in series. The signals to be correlated are applied to multiplier 38. Generally, in A.-C. correlation, one of these signals is applied to a mixer, such as 46, where the signal is combined with the output of the oscillator, such as 48. The output of mixer 46 is then applied to multiplier 38 where it is combined with the other signal being correlated to produce a product signal. The product signal is then applied to a band-pass filter which will pass only the frequencies in a particular frequency band such, for example, as a frequency band substantially equal to the frequency generated by oscillator 48. The signal passed by filter 40 is then applied to a detector 42 where a particular frequency component of the signal applied thereto will be detected, for example, the difference signal component developed upon multiplication at multiplier 38. The detected signal is then applied to the integrator 44 where it is time-averaged over a period of time not substantially less than one-half the reciprocal of the bandwidth of the narrowest band signal being correlated to produce an output or amplitude control signal.

As previously mentioned in regard to FIGS. 3 and 5, it may be desired to limit the bandwidth of the signals being correlated. Thus, filters such as those represented at 50 and 52 may be interposed in the signal path of the signals being compared prior to multiplication at multiplier 38.

FIG. 8 shows a timing A.-C. correlator such as may be utilized as the timing comparator 20 in FIGS. 1 and 2. As shown, a timing A.-C. correlator includes a multiplier 54, band-pass filter 56, detector 58, and integrator 60, all connected in series. The signals being correlated are applied to multiplier 54. As mentioned in connection with FIG. 7, one of the signals being compared is mixed with the output of an oscillator prior to application to the multiplier. In FIG. 8 one of the signals being correlated is mixed at mixer 62 with the output of a local oscillator 64. As previously mentioned in connection with FIG. 5, in timing correlation one of the signals being correlated has the phase of all frequency components included therein shifted by 90°. In FIG. 8 the phase shift is represented as occurring at 90° phase shifter 66. Therefore, one of the signals being compared is mixed with the output of a local oscillator, the phase of each frequency component shifted by 90° and applied to multiplier 54, where it is combined with the other signal being correlated to develop a product signal. The product signal is then applied to band-pass filter 56, which will pass a particular band of frequencies. The signal passed by filter 56 is then applied to detector 58, where the particular frequency component of the product signal developed at multiplier 54, such as the frequency difference signal, is detected. The detected signal is then applied to an integrator 60, where it is averaged over a period of time not substantially less than one-half the reciprocal of the bandwidth of the narrowest band signal being correlated. In the embodiment shown in FIG. 8, filters 68 and 70 may also be included to provide means for limiting the bandwidth of the signals being correlated, as suggested in connection with FIG. 3.

Figures 9, 9A, 10, 10A:
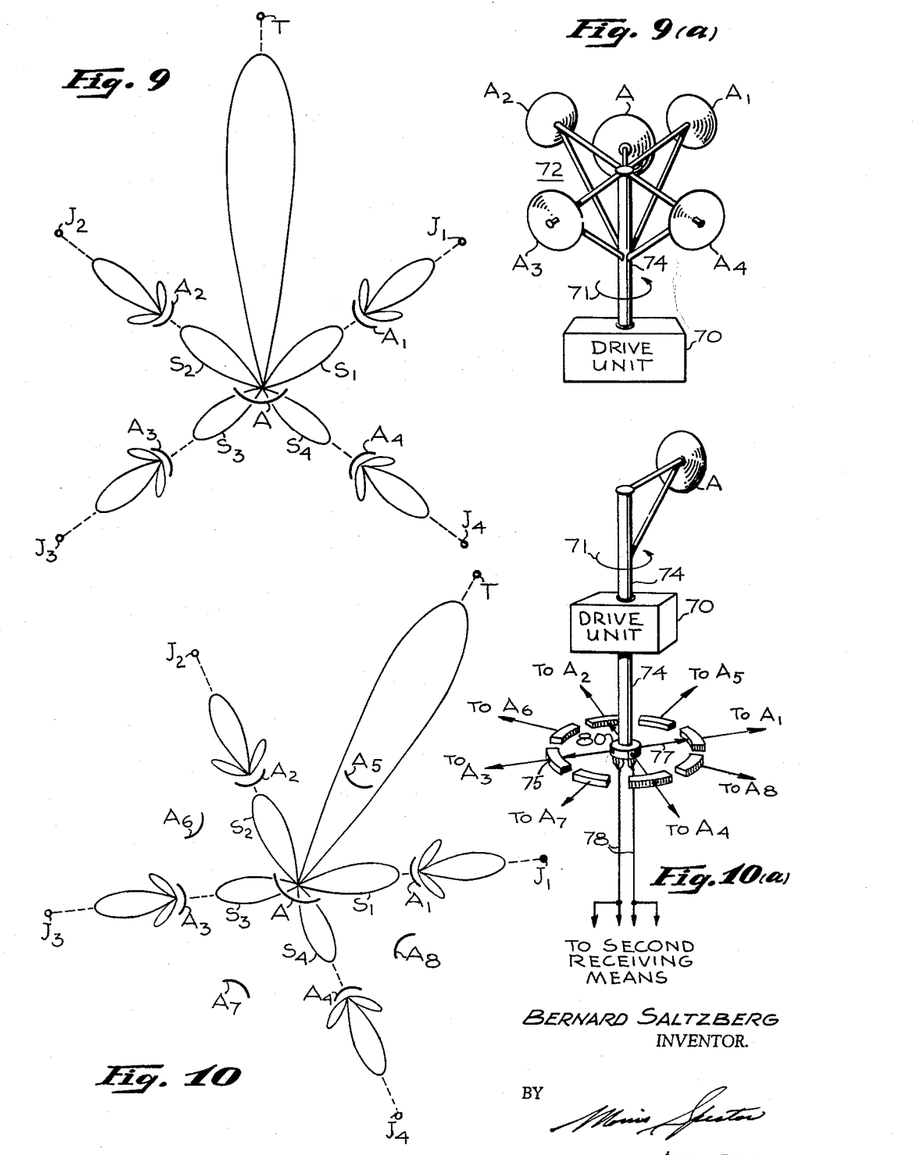
FIG. 9 is a diagrammatic representation of a preferred antenna array useful in providing side lobe suppression for a directional antenna in accordance with the present invention.
FIG. 9a is a diagrammatic representation of a rotational mounting arrangement for the antenna array depicted in FIG. 9.
FIG. 10 is a diagrammatic representation of a preferred antenna array useful in providing side lobe suppression for a positionable directional antenna in accordance with the present invention.
FIG. 10a is a diagrammatic representation of a switching arrangement preferably for use in combination with the antenna array shown in FIG. 10.

As previously mentioned, means may be provided to receive or derive signals to be utilized in eliminating interference signals. FIG. 9 represents an example of an arrangement for separately deriving interference signals associated with a communication system. In accordance with the present invention, this arrangement includes an auxiliary directional antenna for receiving substantially the same interference signal as the communication system. More specifically, as an example of a preferred embodiment of an interference signal deriving means, FIG. 9 shows an array of directional antennae utilized to receive the same interference signals as those which may penetrate the side lobes of a primary directional antenna A associated with a communications system such as radar. As shown, this array provides the means for deriving a separate signal, such as the second signal described in connection with FIGS. 1 and 2, for each side lobe of a directional antenna, thereby providing the side lobe suppression characteristics necessary to prevent detection errors.

More particularly, the auxiliary directional antenna array includes directional antennae $A_1$, $A_2$, $A_3$ and $A_4$, each aligned with a significant side lobe $S_1$, $S_2$, $S_3$ and $S_4$, respectively, of a primary directional antenna A. These auxiliary antennae are so constructed that the main directional gain pattern of each is equal to or less than the primary antenna's side lobe gain pattern associated therewith. Therefore, interference signals transmitted at points $J_1$, $J_2$, $J_3$, and $J_4$ and received by the side lobes of the primary directional antenna A are also received by the auxiliary antenna array $A_1$, $A_2$, $A_3$ and $A_4$. Since each of the auxiliary directional antennae has substantially the same gain pattern as the side lobe of the main directional antenna associated therewith, separate signals are produced having substantially the same amplitude and timing characteristics as the interference signals which are to be eliminated. These signals thus produced may then be utilized as previously described in connection with FIGS. 1 and 2 to cancel interference received by an associated communication system. Therefore, a desired signal transmitted or reflected from a point T may be accurately detected by the main lobe of antenna A.

In order to provide the continued side lobe suppression of a rotating primary antenna, such as in radar, it is necessary to maintain an auxiliary directional antenna substantially in coincidence with each side lobe at all times. As illustrated in FIG. 9a, this may be accomplished by mounting the auxiliary antennae in a fixed relation to the side lobes of the primary antenna upon a frame member represented at 72. By so fixedly mounting the auxiliary antennae, they may rotate with the primary antenna, as depicted by arrow 71, in response to a drive unit 70 about a common shaft 74 and thereby maintain the desired side lobe suppression.

As shown, FIG. 10 represents a modification of the arrangement shown in FIG. 9 for separately deriving interference signals associated with a communication system. In addition to the auxiliary antennae $A_1$, $A_2$, $A_3$ and $A_4$ shown in FIG. 9, FIG. 10 includes auxiliary antennae $A_5$, $A_6$, $A_7$ and $A_8$ arranged symmetrically and each interposed between auxiliary antennae $A_1$, $A_2$, $A_3$ and $A_4$. The antenna array of FIG. 10 represents an example of an antenna arrangement which might be utilized when it is desired that the auxiliary antennae be stationary with respect to a rotating main antenna and still provide side lobe suppression necessary to prevent detection errors caused by interference signals penetrating the side lobes of a main antenna A.

As shown in FIG. 10a, the auxiliary antenna array of FIG. 10 may be utilized in combination with a switching device, illustrated in FIG. 10a, to provide a continuous alignment of an auxiliary antenna with each side lobe of the main antenna A as it rotates. Thus means are provided for deriving separate signals which, as described in connection with FIGS. 1 and 2, prevent possible detection errors which may normally be produced by interference penetrating the side lobes of antenna A. As shown in FIG. 10a, the switching device may include a plurality of contact plates, such as 75, one associated with each auxiliary antenna and a plurality of wipers, such as 77, spaced from each other by an amount representative of the relative spacing of the significant side lobes of the main antenna. Each wiper is coupled to both a drive shaft 74 and a cable 78 by slip rings represented at 80. As shown, drive shaft 74, which is also coupled to antenna A, is driven by drive unit 70. Therefore, as antenna A rotates in response to motor drive 70, as depicted by arrow 71, the wipers also rotate, each consecutively making contact with a different one of the contact plates. As shown, cable 78 provides a separate path to a separate second receiving means such as described in connection with FIGS. 1 and 2. Therefore, at any given time a closed circuit is present from each auxiliary antenna which is aligned with a side lobe of antenna A through an associated contact plate to a wiper and via cable 78 to one of a plurality of secondary receiving means, thereby providing separate second or auxiliary signals which, when controlled as to amplitude and timing as mentioned in connection with FIGS. 1 and 2, will provide means for substantially suppressing all interference entering antenna A.

Although it is particularly desired, when utilizing this invention as a side lobe suppression arrangement, that a plurality of directional antennae, one aligned with each significant side lobe of a primary antenna, function as a detection means, other detection means are possible. For example, when side lobe suppression is not critical and one or more interference sources are present, a directional antenna fixedly detecting each and not necessarily positioned in alignment with side lobes of an associated primary antenna may be utilized to produce the signals necessary for cancellation.

Figure 11:
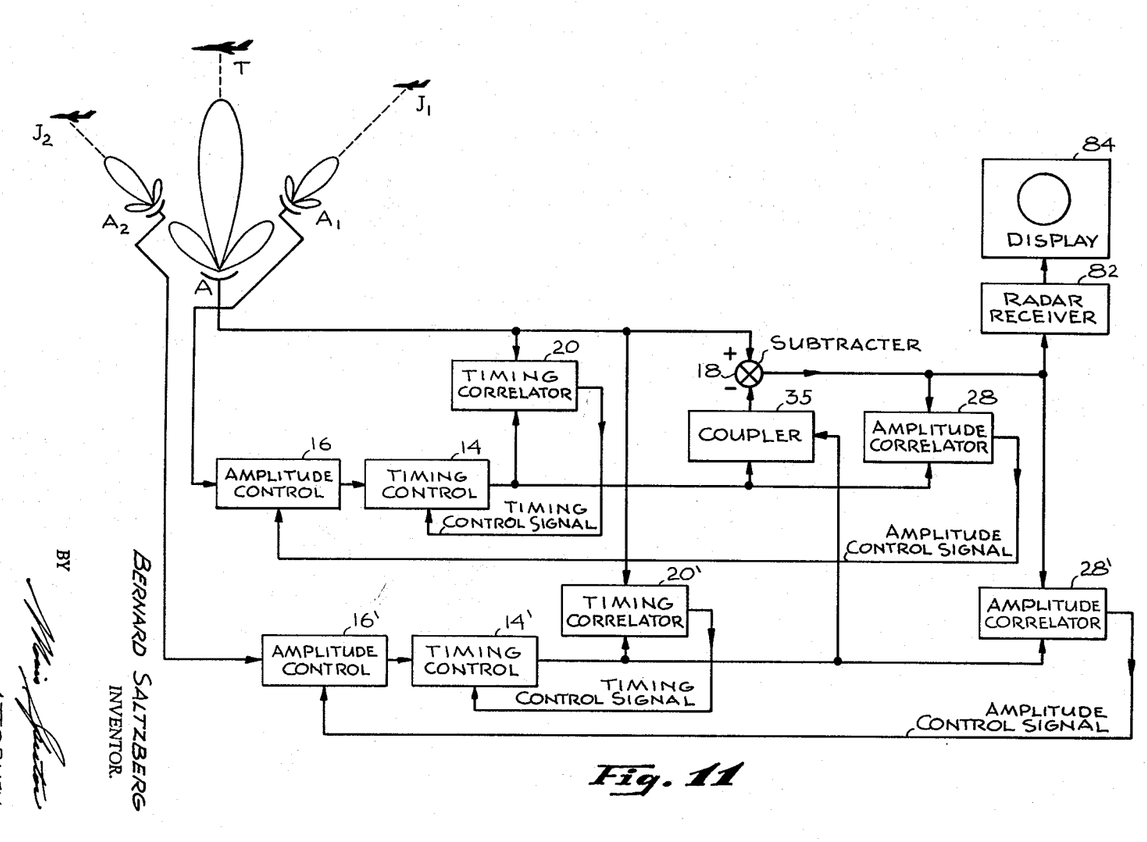
FIG. 11 is a diagrammatic and block diagram representation of a directional receiving system including the interference cancellation features of this invention.

Referring now to FIG. 11, there is shown, by way of example only, a directional receiving system, such as employed in radar, taken in combination with an auxiliary directional antenna array and cancellation system embodying this invention for eliminating the effects of interference signals which are penetrating the side lobes of the directional antenna associated therewith.

Generally, in order to provide substantially complete cancellation of the interference signals penetrating each side lobe of a directional antenna such that the danger of detection errors is substantially eliminated, it is necessary that a signal representative of the signals penetrating each side lobe be separately derived or received. This derived signal is desirably free of intermodulation components which, under conditions where multiple interference sources are present, produces beat signals which in effect constitute additional interference signals. By separately receiving such a signal representative of the penetrating signal or signals and by carrying out the subtraction thereof from the total signal received by a directional antenna at RF frequencies prior to demodulation, a difference or remainder signal is provided which is substantially free of interference. In accordance with the above, the embodiment shown in FIG. 11 includes, in combination with a radar system, an auxiliary directional antenna array, such as described in connection with either FIGS. 9 and 9a or FIGS. 10 and 10a, to provide separate signals representative of the interference signals penetrating the side lobes of a directional antenna A associated with the radar system. These signals are then controlled and subtracted from the signal received by antenna A prior to the encounter of nonlinear elements, such as demodulation or detection circuits within a receiver, thereby overcoming the problems of intermodulation effects. To control the amplitude and timing of each of the signals received by the auxiliary directional antenna array, such that upon subtraction from the total signal received by the antenna A a remainder signal substantially free of interference will be produced, a separate cancellation system, such as that associated with the second receiving means discussed in connection with FIG. 1, is provided for each auxiliary antenna of the array. By providing a separate cancellation network for each auxiliary antenna, a separate timing and amplitude correlation of the signals received by each auxiliary antenna with the interference signal received by antenna A may occur. It is this separate amplitude and timing correlation which provides separate and distinct control of each of the derived signals.

As previously discussed, it is a characteristic of correlation that a signal will be produced only if coherent signals are being compared. Therefore, in accordance with this invention, an amplitude control signal will be applied to an amplitude control element associated with a particular auxiliary antenna only if, upon subtraction, the remainder signal contains components of the interference signal received by the particular auxiliary antenna, and a timing control signal will be applied to a timing control element associated with a particular auxiliary antenna only if a timing difference exists between the interference signal received by an auxiliary antenna and a corresponding component of the interference received by the primary antenna. Thus, signal correlation is of primary importance to this embodiment of the invention, for, in the absence of such correlation, accurate control of the signals received by the auxiliary antenna would be difficult to obtain. This is due generally to the inability of generally known comparator circuits to distinguish a particular signal from a combination of many.

More specifically, as shown in FIG. 11, interference signals transmitted at interference sources $J_1$ and $J_2$ are penetrating the side lobes $S_1$ and $S_2$, respectively, of a primary directional antenna A associated with a radar system. Also being received by the primary antenna A is the transmitted or reflected signal from an aircraft target T which is to be detected.

To control the amplitude and timing of the derived signals, such that upon subtraction thereof from the signals received by antenna A a remainder signal substantially free of interference will be produced, the derived signals are applied to timing and amplitude control elements. The signal received at antenna $A_1$ is controlled as to timing and amplitude at timing and amplitude control elements 14 and 16, respectively. The signal received at antenna $A_2$ is controlled as to amplitude and timing at timing and amplitude control elements 14' and 16', respectively. Having thus been controlled, a portion of the signal received at antenna $A_1$ is applied to a subtractor network 18. Prior to subtraction, this portion of the signal received at antenna $A_1$ is combined at a coupling means 35 with a portion of the signal received at antenna $A_2$ to produce a resultant signal. By way of example only, 35 might be a directional coupler constructed to couple a portion of the energy received at antenna $A_2$ to that received at antenna $A_1$. Upon this combination, the resultant signal is then subtracted from the signal received at antenna A at subtractor 18 and a difference or remainder signal is produced.

As discussed in connection with FIG. 1, the remainder signal will be substantially free of interference only if the derived signals substantially correspond to the interference signals to be eliminated. In accordance with this embodiment of the present invention, amplitude and timing A.-C. correlators, as described in connection with FIGS. 7 and 8, respectively, may be utilized to provide the necessary means for accurately adjusting the control elements such that the individual derived signals will substantially correspond to the interference components to be eliminated, and such that, upon subtraction of the resultant signal from the signal received at antenna A, all interference is substantially eliminated. Adjusting of the timing control elements 14 and 14' is maintained by correlating the signal received at antenna A with the signals received at antennae $A_1$ and $A_2$ at timing correlators 20 and 20', respectively, and by applying the timing control signals thus developed to timing control elements 14 and 14', respectively. Accurate adjustment of the amplitude control elements 16 and 16' is maintained by correlating the remainder signal with the signals received at antennae $A_1$ and $A_2$ at amplitude correlators 28 and 28', respectively, and by applying the amplitude control signals thus developed to amplitude control elements 16 and 16', respectively.

As previously described, due to the coherence characteristics of correlators, timing and amplitude control signals will be developed only if mutually coherent signal components are being compared. Also, in accordance with the present invention, timing control signals will be developed only as long as a timing difference remains between the derived signals and the corresponding components of the interference received at antenna A and amplitude control signals will be developed only as long as an interference component is present in the remainder signal. Therefore, by the use of timing and amplitude correlators, separate and distinct timing and amplitude control signals are developed which will provide accurate adjustment, as previously discussed, of the derived or secondary signals received at each auxiliary antenna, thereby allowing substantially complete cancellation of substantially all interference of antenna A to be achieved and a substantially interference-free signal to be produced.

Therefore, by applying the interference-free remainder signal produced by the above-mentioned subtraction to a radar receiver 82, a detection of target T will be accurately displayed on a scope 84.

As shown in FIG. 11, the operation described has transpired prior to any nonlinear operations, thereby eliminating the possibility of interaction of a plurality of interference signals and overcoming the prior art problems associated with cancellation in side lobe suppression of multiple interference sources.

What is claimed is:

1. A side lobe suppression system for directional receiving systems including: a first directional and positionable antenna having a radiation pattern including a main lobe and a plurality of side lobes for receiving a first signal having an information component and interference components corresponding to wave energy received by the main and side lobes, respectively, of said first antenna; a plurality of secondary directional antennae each having its directional pattern substantially in fixed coincidence with a different one of the side lobes of said first antenna each for receiving an interference signal substantially corresponding to an interference component of said first signal; a plurality of first means each respectively receiving an interference signal from one of said plurality of secondary directional antennae; second means for combining the signals received by said plurality of first means to produce a resultant signal; third means responsive to said first and said resultant signals for developing a remainder signal representing the alternating current difference between said first signal and said resultant signal; a plurality of fourth means each respectively coupled to a different one of said plurality of first means and to said first antenna and each responsive to the interference signal received by its associated first means and the corresponding interference component of said first signal for developing a timing control signal representing the timing difference between said received interference signal and a respective interference component of said first signal; a plurality of fifth means each respectively coupled to a different one of said plurality of first means and to said third means, each for developing an amplitude control signal representing the amplitude difference between said received interference signal from its associated first means and a respective interference component of said remainder signal; and control means associated with each of said plurality of first means and each responsive to timing and amplitude control signals associated therewith for controlling the timing and amplitude of the interference signal received by the associated one of said plurality of first means such that upon subtraction of said resultant signal from said first signal said interference components are substantially eliminated from said remainder signal.

2. A side lobe suppression system for directional receiving systems including: a first directional and positionable antenna having a radiation pattern including a main lobe and a plurality of side lobes for receiving a first signal having an information component and interference components corresponding to wave energy received by the main and side lobes, respectively, of said first antenna; a plurality of secondary directional antennae fixedly positioned around said first antenna for receiving interference signals substantially corresponding to the interference components of said first signal; a plurality of secondary receiving means for receiving the signals received by said secondary antennae; switching means coupled to said first antenna for selectively coupling ones of said secondary antennae to ones of said plurality of secondary receiving means such that a secondary antenna is continuously in substantial alignment with each side lobe of said first antenna as said first antenna is positioned; means for combining the signals received by said secondary receiving means to produce a resultant signal; means responsive to said first and said resultant signals for developing a remainder signal representing the alternating current difference between said first and said resultant signals; a plurality of means each coupled to a different one of said secondary receiving means and to said first antenna and each responsive to the interference signal received by a different one of said secondary receiving means from its associated secondary antenna and the corresponding interference component of said first signal for developing a timing control signal representing the timing difference between said received interference signal and a respective interference component of said first signal; a plurality of means each respectively coupled to a different one of said secondary receiving means and each responsive to said remainder signal for developing an amplitude control signal representing the amplitude difference between said received interference signal and a respective interference component of said remainder signal; and control means associated with each secondary receiving means and each responsive to timing and amplitude control signals associated therewith for controlling the timing and amplitude of the interference signal received by the associated secondary receiving means such that upon subtraction of said resultant signal from said first signal said interference components are substantially eliminated from said remainder signal.

3. In combination: first means for accepting a first alternating current signal having a first and a plurality of second signal components each defined by respectively different amplitude versus time functions; a plurality of second means each for accepting a different second alternating current signal defined by an amplitude versus time function substantially corresponding to an amplitude versus time function associated with one of said plurality of second signal components of said first alternating current signal; third means coupled to said first and said plurality of second means and responsive to said first signal and said plurality of second alternating current signals for developing a remainder signal representing the alternating current difference between said first signal and said plurality of second signals; a plurality of fourth means one coupled to each of said plurality of said second means and to said first means for developing a plurality of first control signals each being substantially proportional to the timing difference between one of said plurality of second signal components of said first alternating current signal and a respective second alternating current signal; a plurality of fifth means one coupled to each of said plurality of second means and to said third means for developing a plurality of second control signals, each being substantially proportional to the amplitude of one of said plurality of second signal components of said first alternating current signal present in said remainder signal; a plurality of sixth means one interposed between each of said plurality of second means and said third means and coupled to a respective fourth means for controlling the timing of a respective second alternating current signal in accordance with a respective first control signal; a plurality of seventh means one interposed between each of said plurality of second means and said third means and coupled to a respective fifth means for controlling the amplitude of a respective second alternating current signal in accordance with a respective second control signal; and eighth means coupled to said third means for receiving said remainder signal.

4. A signal cancellation system comprising: a first receiving means for receiving a first signal having first and second alternating current signal components; a second receiving means for preferentially receiving a second alternating current signal substantially corresponding to said second signal component of said first signal; means responsive to said first and second signals for developing an alternating current remainder signal, the magnitude of which represents the alternating current difference between said first and second signals; a first signal comparator means responsive to said second signal component and said second signal for developing a first control signal which is substantially the time-averaged product of signals to which said means is responsive, the magnitude of said first control signal being substantially proportional to the timing difference between said second signal and said second signal component; a second signal comparator means responsive to said remainder signal and said second signal for developing a second control signal, the magnitude of which is substantially proportional to the time-averaged product of the second signal and the second signal component present in said remainder signal; said first and second signal comparator means comprises a local oscillator; mixing means coupled to said oscillator; multiplier means coupled to said mixing means; a bandpass filter coupled to said multiplier; detector means coupled to said filter; integrator means coupled to said detector means; means for applying one of the signals being compared to said mixing means; means for applying the other signal being compared to said multiplier means; and means responsive to said first and second control signals for controlling the timing and amplitude, respectively, of said second signal such that upon subtraction of said second signal from said first signal said second signal component of said first signal is substantially eliminated.

References Cited by the Examiner
UNITED STATES PATENTS

| | | | |
|---|---|---|---|
| 2,718,638 | 9/55 | De Rosa et al. | 343—100.7 |
| 2,804,618 | 8/57 | Carpenter. | |
| 2,825,900 | 3/58 | Collbohm | 343—100 |
| 2,861,177 | 11/58 | Dishal et al. | 333—18 |
| 2,907,957 | 10/59 | Dewitz | 333—18 |
| 2,938,206 | 5/60 | Davis et al. | 343—100 |

FOREIGN PATENTS

| | | | |
|---|---|---|---|
| 493,340 | 6/38 | Great Britain | 343—100.7 |
| 720,345 | 12/54 | Great Britain | 343—100.12 |

OTHER REFERENCES

Electronics, May 22, 1959, pages 58–60 relied on.

CHESTER L. JUSTUS, *Primary Examiner.*

KATHLEEN CLAFFY, *Examiner.*